Jan. 26, 1954
H. G. FISCHER ET AL
2,667,194
COMPOSITE BIT SCREW DRIVER
Filed May 24, 1950
2 Sheets-Sheet 1
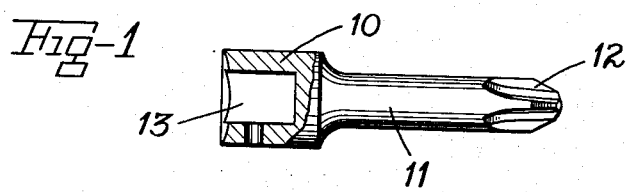
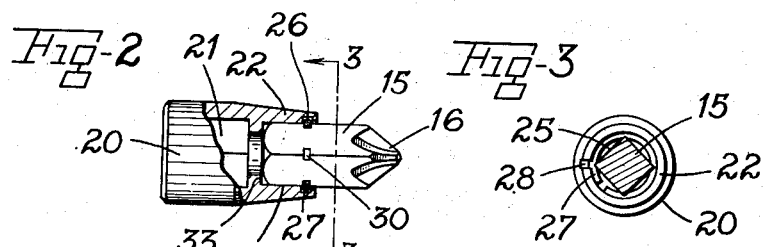
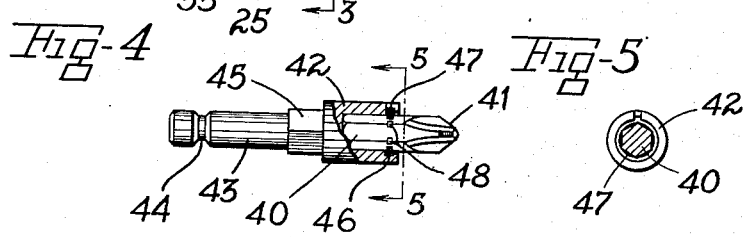
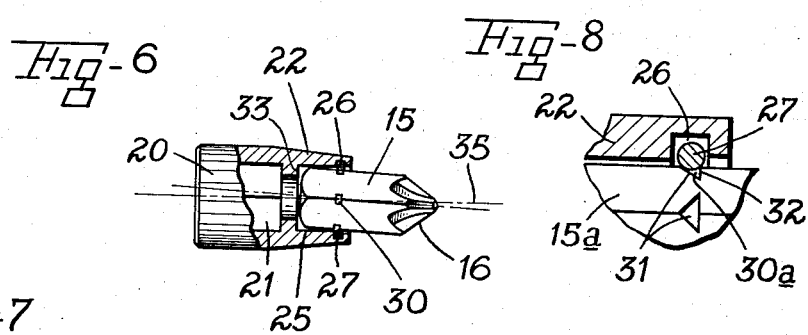
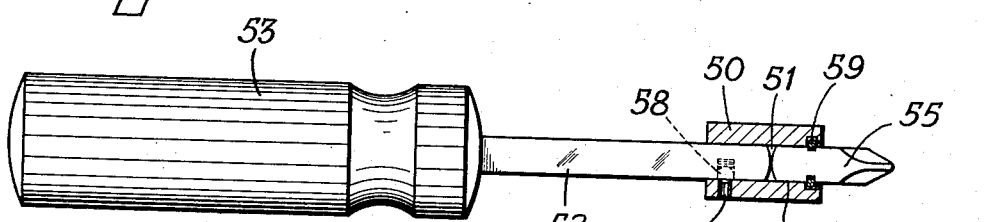
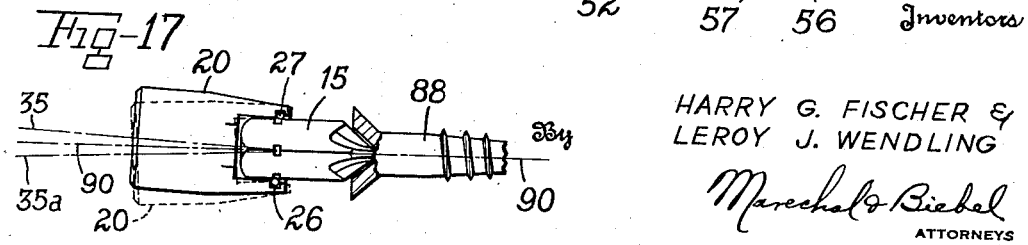
Inventors
HARRY G. FISCHER &
LEROY J. WENDLING
Marechal & Biebel
ATTORNEYS Jan. 26, 1954
H. G. FISCHER ET AL
2,667,194
COMPOSITE BIT SCREW DRIVER
Filed May 24, 1950
2 Sheets-Sheet 2
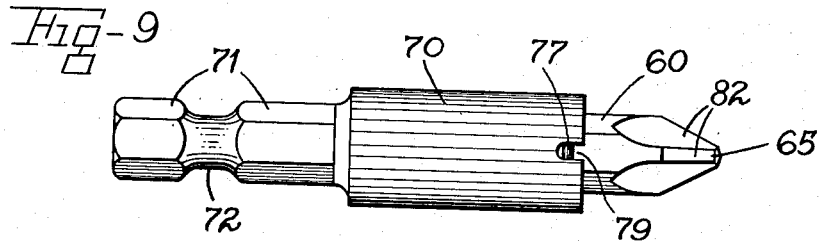
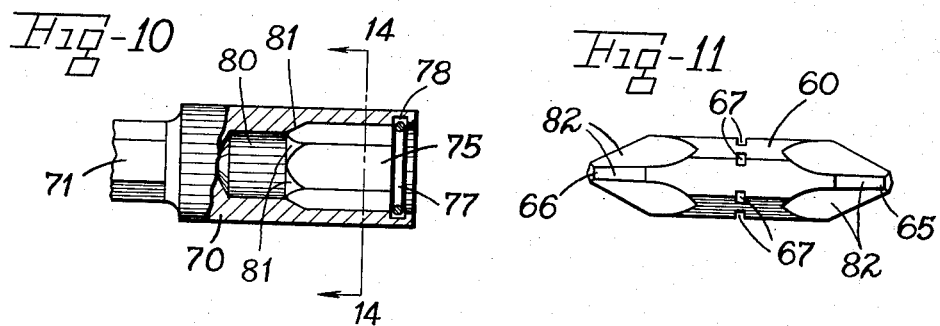
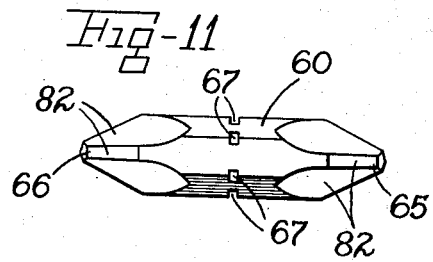
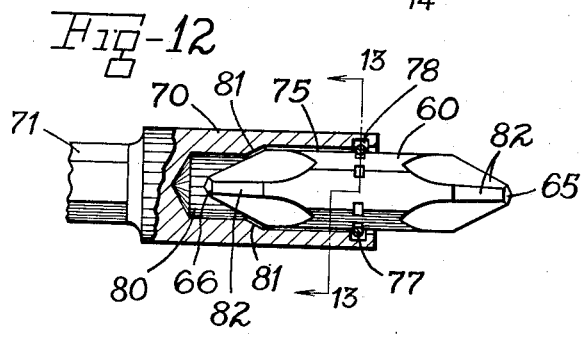
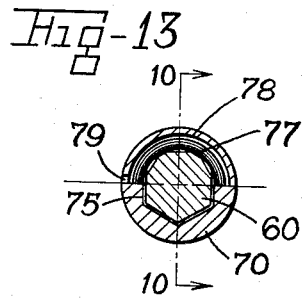
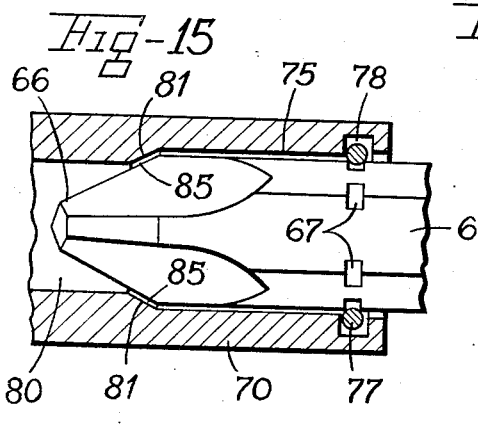
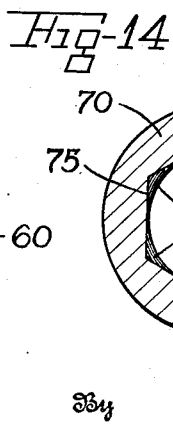
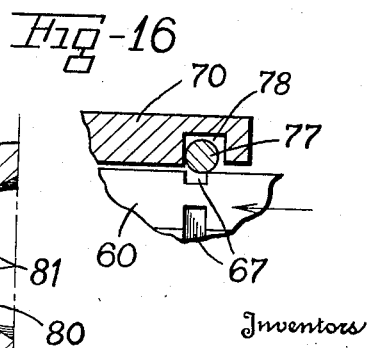
Inventors
HARRY G. FISCHER &
LEROY J. WENDLING
Marechal & Biebel
ATTORNEYS Patented Jan. 26, 1954

2,667,194

UNITED STATES PATENT OFFICE 2,667,194

COMPOSITE BIT SCREW DRIVER

Harry G. Fischer and Le Roy J. Wendling, Dayton, Ohio, assignors to The Apex Machine & Tool Company, Dayton, Ohio, a corporation of Ohio Application May 24, 1950, Serial No. 164,002

1 Claim. (Cl. 145—50)

This invention relates to bits or screw drivers, such as are used with power driven drivers and hand braces or drivers. This application is a continuation in part of our application Serial No. 708,062, filed November 6, 1946, now issued as Patent No. 2,522,217, dated September 12, 1950, which is a continuation in part of our application Serial No. 496,542 filed July 29, 1943 for Improvement in Bits, now abandoned.

In recent years, especially in industries such as the aircraft and automobile industry, the use of recessed head screws and bolts has grown until such are used in a great variety of sizes and dimensions; and the great variety of places in which such recessed head screws and bolts are used and the necessity for using them in such large quantities has led to the widespread use of power drivers, using electric and pneumatic motive power in addition to the use of these bits with more conventional hand screw drivers and hand operated brace type or spiral type of drivers. A good illustration of a bit of the character referred to and widely known in industry as the Phillips bit, is illustrated in Fig. 1 of the drawing, but it is to be understood that this type of bit is utilized for illustrative purposes, because of its very widespread use, and that a great variety of sizes and kinds of bits and screws with which they are to be used and also of power drivers for the bits are in use.

Such bits, as illustrated in Fig. 1 of the drawing, have heretofore been made with a socket or drive end adapted to receive the drive shaft, or to be received in a chuck, of the power or hand driving tool with a bit part accurately formed to fit the particular size of screw with which it is to be used. They have been made as shown in Fig. 1 as a single piece, of a special shock resisting steel, heat treated and tempered to get best results in the work on which they are to be used. They have possessed a combination of hardness for resistance to wear, toughness and strength to withstand the shock of the most difficult screw driving job, and precision machining to give the best possible fit in the recess of the head of the screw. Bit devices of this sort, especially for large scale production such as is encountered in the airplane industry, the automobile industry, and other large quantity production industries have been made as of unitary construction illustrated in Fig. 1 of specially selected alloys to give the described properties. Being a unitary structure each such bit has been made usually by machining it out of a rod or billet of the alloy steel so as to give the proper shape for the drive receiving parts and the proper dimensions of the bit work portion and also to give the inclination and thickness of the projections or vanes which are machined to proper inclination and in proper proportions to the walls of the recess in the head of the screw or bolt, with the desired result that when properly inserted the screw would hold by friction on the bit work part and proper driving connection would also be secured.

Despite the fact that these so-called bits have been made of very carefully selected alloy to give the desirable long life referred to nevertheless they wear out rapidly as they are used repeatedly and many times during a work day. The cost of them, because of being machined out from a rod or billet to the form described, is substantial and it is a general practice to return these bits for reconditioning. This means that the end which fits into the screw recess is remachined, each reconditioning shortening such screw recess engaging portion approximately ⅛". And as the affected portion which is thus available for reconditioning is ordinarily comparatively short, probably ½" or so being thus available in a unitary device such as is illustrated in Fig. 1, which is of approximately ¼" diameter, it can be reconditioned only a few times and then the entire device is rendered useless.

Furthermore, because of the great variety and many sizes of screws and bolts which are used, an operator must carry a large number of these bit devices with him if rapid production is to be obtained, and exchange one size and form for another according to the form and size of the various screw heads used. So that these special devices for use with Phillips bits and the like, which have been in the most widespread use, have long been subject to the disadvantages that they are expensive to make and wasteful of expensive and scarce alloys because of having been machined from a comparatively large piece of alloy stock which is substantially uniform in size and quality. Also the workman is required to keep with him at all times a considerable number and variety of these complete devices, to fit the numerous sizes of screws having slots of great variety and of many varying dimensions each requiring a bit part specially and accurately formed to properly cooperate with and be suitably usable with such wide variety of screws. Further the employer is required to stock a very large number of these unitary bit devices, not only to provide the various sizes but also to provide different drive constructions to fit different hand and power driving tools.

It is one of the principal objects of the present invention to provide bits for use with such screws and associated means so arranged that these difficulties will be substantially overcome, and the original cost of the bits will be greatly reduced over the former type of unitary device described.

Another object is to provide a construction in which all of the drive receiving and bit parts need not be returned for reconditioning.

Still another object is to provide small bit parts for connection to a driving part, in which the actual bit portion which fits into the recessed screw head may be made of a different grade of metal; and, in addition, so many more of these smaller bit parts can be made from a ton of metal that there will be greater economies effected even though the bit portions are not returned for reconditioning.

Another object of the invention is to provide a two-part bit construction in which one part serves to receive, or be received by, the hand or power driver and also to receive bit portions which are properly constructed to fit the screw head recess and which can nevertheless be much cheaper and generally of material of composition more preferable for the bit than that which is required when the whole bit mechanism is made in one part, such as chisel steel.

Still another object of the invention is to provide a special form of separable drive part which may be utilized for hand or power drivers and which will also readily receive short special bit parts and which is of such construction as to permit ready removal and insertion of bits of the desired size and configuration and which will also give some flexibility as between the drive part and the bit part so as to avoid the excessive care which is ordinarily required for lining up the unitary devices such as in Fig. 1 when satisfactory use is desired and excessively rapid wear is to be avoided.

It is also an object of the invention to provide a two-part bit construction in which the bit is formed with a working portion at each end and in which the bit holder is formed to receive and hold the double-ended bit with one end exposed in proper working position while giving the same flexibility or axial adjustment as to cause the exposed bit end to fit properly into the corresponding recess of a screw and to permit driving in this controlled misaligned relation for effectively driving the screw and to permit power drive and avoid undue wear and breakage while supporting the other working end of the bit out of contact with abutments or other surfaces capable of causing damage thereto during use of the exposed end portion.

Other objects and advantages of the invention will be apparent from the following description, the accompanying drawings and the appended claims.

In the drawings—

Fig. 1 illustrates a conventional form of a unitary square socket bit of the character heretofore used;

Fig. 2 is a side view partly in elevation and partly in section of a complete bit mechanism of this invention adapted also to receive a similar square drive;

Fig. 3 is a sectional view taken approximately on the line 3—3 of Fig. 2;

Fig. 4 is a side view, partly in section, of a complete bit mechanism of this invention adapted to be received in a chuck type of driver;

Fig. 5 is a sectional view taken approximately on the line 5—5 of Fig. 4;

Fig. 6 is a view in enlarged detail showing the misalignment which may occur, but with the axial misalignment exaggerated for clearer showing;

Fig. 7 is a view of a modified form of composite bit and bit holder shown mounted on the shaft of a hand operated screw driver, parts being broken away and shown in vertical section to illustrate details of internal construction;

Fig. 8 is an enlarged fragmentary section showing a bit member having a modified form of retaining notch permitting more ready withdrawal of the bit from the bit holder;

Fig. 9 is an enlarged view in side elevation showing another form of the invention embodying a double-ended bit member;

Fig. 10 is a detail view of a portion of the bit holder of Fig. 9 and with the socket partly broken away in vertical section on the line 10—10 of Fig. 13;

Fig. 11 is a side elevation of the double-ended bit member;

Fig. 12 is a view similar to Fig. 10 showing the bit member assembled in the bit holder;

Fig. 13 is a section on the line 13—13 of Fig. 12;

Fig. 14 is an enlarged half-section on the line 14—14 of Fig. 10;

Figs. 15 and 16 are enlarged fragmentary views illustrating the relative movement of the bit member and bit holder which may take place during use of the double-ended composite bit device; and Fig. 17 is a diagrammatic view similar to Fig. 6 further illustrating the axial misalignment which may occur.

Referring to the drawings, which illustrate preferred embodiments of the invention, Fig. 1 shows a unitary bit device of the conventional construction which is formed of a single bar of metal initially of the diameter of the larger drive end 10 and which requires several machining operations to reduce it to the lesser diameter of the portion 11 carrying the bit point 12, this latter diameter being approximately half that of the socket portion, and also a further machining operation to provide the socket 13 for a driving member. This is in contrast with the much simpler construction of the preferred embodiments of the present invention shown in the other figures of the drawing.

Referring to Figs. 2 and 3, the bit device of the present invention when ready for use comprises a separable bit member 15, which is shown as square in cross section except at the working end where it is tapered and grooved, as indicated generally by the numeral 16, to the right dimensions and inclination to fit the bit-receiving recess of the particular screw or bolt with which it is intended to be used. The bit holder 20 is provided with a squared socket portion 21 at one end to receive a driving shaft having a squared end, and it has an annular portion 22 at its other end formed internally to provide a squared socket portion 25 to receive the similarly squared inner end of the bit 15.

The end 22 of bit holder 20, which contains the socket 25 and is adapted to receive the bit, is preferably externally tapered. Adjacent its extreme end, the inner walls of socket 25 are provided with an internal groove 26 which receives therein a resilient wire spring, preferably made of piano wire or some such high tensile spring wire, and a notch 28 is cut in the end of the socket wall and into the groove 26 to receive a tool for compressing spring 27 for removal from groove 26. This spring or ring is formed in such dimensions that when assembled in groove 26, it will have an internal diameter somewhat less than the diagonal of the square portion of bit 15, which is provided on each of its four corners as shown with a notch or groove 30, which need not extend all around the bit but preferably is cut out of each corner.

It will be noted, as stated, that the spring ring 27 is so formed that when in position in the socket, and without a bit 15 inserted, the internal diameter is somewhat less than the diagonal between two opposing corners of the bit. As a result, as the bit is pushed in the proper distance, the snap spring is first expanded and then contracts to snap into the notches 30 and thus lock the bit into the bit holder so that the resulting composite bit device will provide sufficient drive power for use with electric or pneumatic driven devices. The snap spring will hold the removable bit against longitudinal displacement in one direction, and the shoulder 33 intermediate the sockets 21 and 25 will abut the inner end of the bit and serve to prevent the bit from moving axially under the pressure applied in operation, i. e. to prevent the bit from pushing too far during operation as described hereinafter in connection with Fig. 6.

It will be seen that the bit member 15 can be readily removed from the bit holder by giving a pull that will overcome the restraining action of the snap spring 27, and that this will permit changing bits whenever desired. Thus bits having the same polygonal inner end portion but having different tapers and different depths of grooves and different thicknesses of the driving wings between the groove—to fit screws or bolts having different recesses in the heads—can be immediately exchanged, and as the bit 15 weighs only a small fraction of the older conventional unitary bit construction heretofore used, the workman can carry in his pocket or kit a very large supply of the bit members of this invention of varying sizes and dimensions for use with a single holder 20. Furthermore, since each of these bit members is much smaller and lighter than the conventional unitary bit device of the type shown in Fig. 1, its initial cost in both labor and materials is substantially reduced with respect to the corresponding costs of the type of bit device shown in Fig. 1 as described, and any one of a great number of such bits may be used as desired.

The notch 30 in bit 15 may be right-angled as shown in Figs. 2 and 6, or generally V-shaped as shown at 30a on the bit 15a in Fig. 3. The latter arrangement provides an inclined face 31 in the notch which acts as a cam facilitating removal of the bit, while the transverse face 32 has more positive locking action with the spring 27 in limiting movement of the bit inwardly of the socket beyond the spring.

Referring now to Figs. 4 and 5, the bit member 40 is formed similarly to bit member 15 and has its working end 41 grooved and tapered to fit the recesses in a screw or bolt head in the manner described. The other end 41 of bit 40 is hexagonal in cross section, as distinguished from the square corresponding portion of bit 15, for proper driving fit in the correspondingly shaped socket in the bit holder 42. This bit holder 42 is made integral with its drive end 43, which is of reduced diameter and is adapted to be used with a different type of drive member, with the round shaft portion 43 held in a corresponding socket in the drive mechanism. This portion 43 is shown as provided with a groove 44 for the purpose of receiving a lock ball or the like to hold it in driving connection, and the portion 45 of bit holder 42 may be made square, as shown, or otherwise adapted for holding it to turn with the driving tool, as by means of one or more flattened portions, a groove to receive a key, or the like.

The bit holder 42 in Figs. 4 and 5 has a groove inside its outer end as indicated at 46, and this groove receives a normally contracted spring lock ring 47 similar to the ring 27. When the bit is inserted into place in the bit holder 42, this snap spring is first expanded, and then as the slots 48 come opposite it, the ring immediately contracts and thus holds the bit locked in place with sufficient force, the bottom of the socket which receives the bit, in each form of the invention as described, serving to prevent the bit from pushing too far during operation.

For most satisfactory use of bits of the above character for driving screws or bolts having a bit-receiving recess such as the Phillips type described, it is required that the bit end which fits into the recess in the bolt or screw be in substantially complete alignment with the bit. Otherwise the bit end will not fit properly into the recess, which is tapered and shaped of the proper dimensions to receive the bit with a snug driving fit, and this is seriously objectionable. For example, if the unitary device illustrated in Fig. 1 is somewhat out of alignment, it may still have enough driving contact with the recessed screw head to permit driving the screw home. Nevertheless, this will put all of the driving torque on only a part of the cooperating bit end surfaces, thus increasing the pressure per unit area and frequently breaking this end of the bit. In addition, such misalignment will cause a rocking motion of the working end of the bit in the recess during rotation, and this also causes excessive wear. This is due to the fact that the entire bit structure is a single and rigid unitary piece, and the workman has to exercise considerable skill and care in getting the parts properly aligned if satisfactory work is to be assured or else run the risk of unsatisfactory work and also of breaking or excessive wear.

In the construction shown in Figs. 2 to 6, with the bit member separable from the driven member which holds it, a certain amount of adjustability or flexibility may be allowed in the parts of the bit device without in any way affecting the transmission of power, and this slight flexibility makes it unnecessary to exercise such great care and skill in the use of the bit, although the bit is properly and tightly fitted into the recessed screw or bolt head. This condition is illustrated in Fig. 6, in which the bit receiving socket in the bit holder is formed somewhat larger in cross section than the bit it is to receive, to provide a small but suitable amount of clearance.

This clearance, with the bit held in place as described, permits the bit to "float" in the socket so that the parts may be out of axial alignment and still give proper driving of the bit and proper fit of the bit point in the screws. The relative angular adjustability is considerably exaggerated in Fig. 6 for purposes of clearer disclosure. Actually only a small amount of clearance and a small amount of adjustability or "floating" is required so that the bit may be caused to operate satisfactorily in alignment with the screw during operation even though the bit holder and driving mechanism may be so positioned that their axes are angularly arranged with respect to the axis of the bit 15 in the manner shown. For example, with a square-shank bit of the character shown in Figs. 2, 3 and 7, where the shank of the bit is 5/16 inch, or 0.3125 inch, square, the bit socket may satisfactorily be machined sufficiently larger to give a clearance or "float" of approximately 0.003 to 0.010 inch. Of course the amount of clearance and "float" for a particular size of bit will vary somewhat with the cross sectional dimensions of the bit itself. For example, for a 1/4 inch square bit, the socket in the bit holder has been found to give satisfactory results, comparable to those referred to above, when the width of each wall of the socket is from 0.255 to 0.257 inch, giving a clearance of 0.005 to 0.007 inch.

Since clearances of this small range, measuring a few thousandths of an inch, cannot adequately be shown in a patent drawing, the clearances are considerably exaggerated for purposes of clearer disclosure in Fig. 6, which shows the bit 15 as tilted downwardly with respect to the axis line 35 of the bit holder 20 to the maximum angular extent permitted by contact between the upper portion of the inner end of the bit and the adjacent inner wall surface of the socket. Also, the bit is shown as having moved inwardly of the socket along its lower edge to such extent that the snap spring 27 has been expanded to be partly out of normal register with the lowermost notch 30 but is still in holding engagement with one edge of this notch, the bit being thus held in maximum position of angular misalignment of the axes of the bit part and its holder, and without contact between the inner end of the bit and the shoulder 33, this arrangement, as clearly shown in Fig. 6 with the axial clearance for the bit in the socket as well as the radial clearance which permits the "float" with axial misalignment during rotation, being obtained when the notches 30 are spaced from the inner end of the bit a limited distance less than the distance from the spring 27 to the shoulder 33 as shown in Fig. 6.

In Fig. 7, the bit holder 50 of the composite bit device is shown as having a square socket 51 adapted for detachable engagement with the shaft 52 of a hand screw driver having a handle 53. The bit holder 50 also is machined to have approximately the same clearance with respect to this end of shaft 52 as is described above in connection with bit 15 and bit holder 20, and the same is true with respect to the clearance as between the bit member 55 and its receiving socket 56 in bit holder 50. By this construction the removable bit 55 can float in the socket 56 and the handle 52 can float also with respect to the socket 51, which gives considerable additional leeway in operation and is especially desirable in connection with hand operated screw drivers of the character shown or other hand operated screw drivers such as those of the so-called "Yankee" screw driver type in which the operator's hand may cause substantial variations in alignment during operation. By the use of this double float equally satisfactory operations can be secured, as referred to for illustrative purposes above in connection with an actual instance in commercial operation.

It will be noted that in the form of construction illustrated in Fig. 7, the bit holder 50 is not provided with an intermediate shoulder or abutment such as 33 in Figs. 2, 4 and 6. This is omitted in order that the removable bit member 55 may be readily ejected for replacement by tapping the handle of the screw driver on the floor or other fixed object so that the handle 52 will move forward and act as an ejecting implement; whereas in the form of construction illustrated in Figs. 2 through 6 the removable bit must be pulled out by hand, or by pliers, or other suitable gripping tool. In Fig. 7, the numeral 57 illustrates a recess or passage in the wall of the socket portion 51 adapted to receive a spring pressed ball or other detent 58 carried by the handle. In hand operated devices the axial pressure exerted is not so great as in power driven devices and consequently the detent will ordinarily be sufficient to hold the composite bit device on the shaft 52, and the lock or snap ring 59 will be sufficient to hold the removable bit member against operating pressure. This permits of somewhat simpler machining operations and also supplies the ready means for ejecting a removable bit as desired.

Figs. 9 to 16 show a different construction of composite bit in accordance with the invention in which the hexagonal bit member 60 is provided with working points 65 and 66 at either end thereof and with notches 67 around its periphery at a position intermediate its two ends. The bit holder includes an annular socket portion 70 and a polygonal male end section 71 for driving engagement with a female driving member, and this part 71 is formed with a peripheral groove 72 for receiving a lock ball or other detent to hold it in the driving member. The annular socket portion 70 of the bit holder includes a hexagonal portion 75 for receiving the bit 60 in driving engagement, and a snap ring 77 is mounted in a retaining groove 78 near the outer end of the socket for engagement with the notches 67 in the bit, with a notch 79 being provided in the outer end of the socket portion 70 to facilitate removal of spring 77 as described in connection with Fig. 3.

The inner end of the socket portion of the bit holder is formed with a cylindrical bore 80 which is of approximately the same diameter as the diagonal across opposite sides of hexagonal socket portion 75 and of smaller diameter than the diagonal across opposite edges of the bit 60. This bore is spaced inwardly from the inner end of the hexagonal socket portion 75, and the intermediate portion of the socket is chamfered or otherwise formed to provide tapered shoulders or seats 81 at each corner of the socket, the angle of taper of these shoulders being preferably equal to the angle of taper of the wing portions 82 of the working points 65 and 66 of bit 60. For example, this construction may be readily produced by first boring the bit holder to the radius of the bore 80, followed by a broaching operation to form the hexagonal portion 75 of the socket, and then forming the shoulders 81 by means of a hexagonal broach or similar tool having a conical tip ground to the same angle of taper as the wing portions 82 of the bit points.

The dimensions of the parts in this form of the operation are selected to give predetermined operating clearances for assembly and disassembly while providing for floating action of the bit within the bit holder as described in connection with the other forms of the invention, and while also protecting the working point of the bit which is not in use against contact with the inner part of the socket. As an example of suitable clearances, which are considerably exaggerated in Figs. 12, 15 and 16 similarly to Fig. 6 as described, if the bit 60 is 0.250 inch in width across its opposite sides, satisfactory results have been obtained with a corresponding dimension of 0.257 inch for the socket and with the snap ring 77 having a total axial clearance of approximately 0.009 inch in groove 78 and an average radial clearance of the order of 0.010 inch in the groove 78 when this ring is engaged within the notches 67 in the bit. With these other dimensions, satisfactory results are obtained with a diameter of 0.250 inch for the bore 80 within the socket and with the depth of the socket portion 76 such that when the snap ring 77 is seated in all of the notches 67 and is abutting the axially inner face of groove 78 as shown in Fig. 16, there is a perpendicular clearance of approximately 0.065 inch between the wing portions 82 at the inner end of the bit and the shoulder 81, this clearance being represented at 85 in Fig. 15.

In operation with this form of the invention and with clearances of the order described, a compound floating movement of the bit can take place depending upon the operating conditions and in substantially the same manner as described in connection with Fig. 6. In the event of axial misalignment of the bit and bit holder, the bit can rock with the spring 77 in the bit holder to the full extent provided by the clearance for the spring in groove 78 and the clearance for the inner end of the bit within the socket while maintaining the desired snug driving fit of its exposed working point in the screw recess.

If in use the axial pressure is so great as to cause the bit to move back into the socket until one or more of the wing portions 82 at its working end 66 seat upon their adjacent shoulders 81, further inward movement of the bit will be prevented, but it will still be free to rock on the shoulders 81 to the full extent provided for by the clearance of the snap ring 77 in its retaining groove 78. Under these conditions, the tendency of the inner end of the bit to wedge in the socket is effectively prevented by having the shoulders 81 tapered as described at the same angle as the wing portions 82 of the working point of the bit.

It will be seen that even in this extreme position of the parts, the portion of the working point 66 which in use enters the recess in the screw or bolt to be tightened is maintained within the bore 80 completely out of contact with the surrounding wall of the socket, and it is thus effectively protected against damage and is held in readiness for use when the working point 65 is worn out or broken and the bit is changed end for end in the socket. In addition, since wearing or breaking of the bit usually occurs near the tip of its working point, with the shoulders 81 proportioned as disclosed to engage the wings 82 adjacent their radially outermost portions, proper seating of the wings on shoulders 81 will be obtained even if the point 66 has been broken, and proper use of the exposed point 65 will still be assured.

This double-ended bit construction provides the same advantages of convenience and accuracy described in connection with Figs. 2–8, and in addition it is even more economical of the high grade steel used in the bits, since it provides double the useful life of a single bit with a relatively slight increase in the amount of stock used therein. For example if a quarter-inch hexagonal bit of the type shown in Figs. 4 and 5 requires an overall length of 1 inch, the same bit size may be satisfactorily formed with two working points as shown in Fig. 12 in an overall length of only 1 3/16 inches and at approximately the same or less cost so far as machining is concerned as two of the single-ended bits.

Fig. 17 shows in somewhat diagrammatic form, and greatly enlarged as to actual dimensions and tolerances, the general action of transmitting axial thrust and torque when the bit holder and the driving tool therefor are inclined with respect to the axis of the screw and the insert bit part. The axis of the screw 88 here illustrated is in substantially horizontal plane, and the recess of the screw head, as in the well known Phillips type screw, has the faces forming the recess angularly inclined by a predetermined relative inclination both transversely and axially. Likewise the end of the member 15 which is machined to seat in and snugly fit within the recessed head is provided with vanes which are tapered both axially and in the transverse direction to provide interfitting, and also driving faces, having the angles properly and closely coordinated with an angular alignment in the corresponding surfaces in the recess, but of a somewhat different angle to permit of readily guiding the vanes of the part 15 in the proper driving relationship with all of the cooperating surfaces of the recess.

As the operator inserts the driving end of the member 15 into the recess, he attempts to secure axial alignment of the screw, the part 15, the part 20 and the power providing member. As this is difficult to accomplish with complete accuracy because the parts are relatively small, in the present invention the operator need only bring the driver and composite bit into position where they will be in reasonably close axial relationship, and by then pushing the member 15 into the recess without too abrupt or severe pressure the cooperating angular surfaces will guide, or cam, the vanes and point of the member 15 into the proper interrelation and fit within the correspondingly formed recess. This will bring the member 15 into coaxial interfitting relation with the screw.

If the operator is holding the power driving mechanism and the part 20 somewhat out of axial alignment with the screw, within the permissible range of misalignment included within the dimensions and tolerances of the device, satisfactory dimensions being stated above, the maximum angular misalignment which can be obtained with the screw and the bit 15 properly interfitting in coaxial relation will be as illustrated in enlarged diagrammatic view in Fig. 17. In other words, when the axial misalignment varies by an angular amount represented by the angular distance between the horizontal axial line 90 and the inclined upper and lower axial lines 35 and 35a, the inner end of the member 15, as shown, will have rocked within the permissible tolerance to abut against the inner wall of the recess 25—see Figs. 2 and 6. Further deflection could be readily felt by the operator because it would result in moving the member 15 out of its proper close fit in the recess, and the tolerances are such as to give permissible axial misalignment which is within the reasonable skill and observation of the workman.

In this position, as shown in Fig. 17, which in dotted lines of the member 20 corresponds to the precise showing of Fig. 6, and in full lines of the member 20 corresponds to the showing after the rotation of 180° of the showing of Fig. 6, the lock spring 27 under the thrust will ride against the inner axial wall of the groove 27 and, under proper dimensions the portion of the ring 180° away, that is at the bottom as shown in Fig. 17, will likewise be urged by the thrust against the outer wall of the groove. This relationship is maintained so long as the axial misalignment remains constant throughout the rotative movement of the composite bit member and the screw, and therefore there would be no friction or movement or wear, and in operation misalignment will be compensated for entirely within the member 20 as the spring 27 will flex, as necessary, under thrust to press down against a corresponding wall of the groove 26.

In rotation therefore there can be no more disturbing action than the continuously rotating zone of maximum thrust pressure; and the overall dimensions of the spring and the groove 27 are such that any slight radial movement due to axial misalignment is well within such dimensions. And therefore as the composite bit member is rotated with the part 15 in more or less misalignment with the part 20, this action of the spring will permit any necessary pressure deflections under axial thrust as well as any slight changes in transverse positioning to permit of the part 15 remaining in proper coaxial driving fit with the screw and within the recess in the head thereof while compensating for slight angular misalignment. As stated above, Fig. 6 is purposely drawn to show the dimensions and tolerances greatly enlarged so that they may be more readily visualized and understood and this is true also of Fig. 17; and Fig. 17 is drawn in full lines to be 180° away from the position of Fig. 6 for purposes of general illustration of the mode of operation.

While the forms of apparatus herein described constitute preferred embodiments of the invention, it is to be understood that the invention is not limited to these precise forms of apparatus, and that changes may be made therein without departing from the scope of the invention which is defined in the appended claim.

What is claimed is:

A composite bit for use with a screw having a bit-receiving recess tapered and shaped to receive with a snug driving fit the working point of a bit having driving wings, comprising a bit holder including an annular end portion forming a socket of polygonal cross-section, a bit of cross sectional configuration providing for driving engagement thereof in said polygonal socket, a working end on said bit including tapered wings formed for said snug driving fit within said recess of said screw, shoulders adjacent the other end of said bit tapered in the opposite direction from and at substantially the same angle as said wings, said bit having peripheral notches at a point thereon intermediate said ends thereof, resilient retaining means within said socket for engagement in said notches to effect releasable locking of said bit in said socket with said working end exposed, the cross-section of said bit being less by a predetermined small amount than the cross-section of said socket to provide for corresponding limited axial misalignment of said bit in said socket with said retaining means engaged in said notches while maintaining proper driving of said bit and proper fit of said working point in said recess in said screw, tapered seats within said socket proportioned to engage only the radially outer portions of said shoulders on said bit, said socket extending axially inwardly beyond said seats to receive the shouldered end of said bit of lesser radius than said seats, said seats being spaced axially beyond said retaining means by a greater distance than the spacing on said bit of said notches from said shoulders to cause said bit to be held normally by said resilient means with said shoulders spaced from said seats while providing for seating of said shoulders on said seats upon movement of said bit into said socket under working pressures sufficient to cause partial disengagement of said retaining means from said notches, and said seats being tapered at substantially the same angle as said shoulders to provide for firmly seated engagement of said shoulders on said seats without relative wedging thereof upon said movement of said bit into said socket under said working pressures.

HARRY G. FISCHER.
LE ROY J. WENDLING.

References Cited in the file of this patent

UNITED STATES PATENTS

| Number | Name | Date |
|---|---|---|
| 686,424 | Smith | Nov. 12, 1901 |
| 761,391 | Ohlson | May 21, 1904 |
| 839,105 | Butler | Dec. 25, 1906 |
| 1,395,888 | Ayotte | Nov. 1, 1921 |
| 2,522,217 | Fischer et al. | Sept. 12, 1950 |

FOREIGN PATENTS

| Number | Country | Date |
|---|---|---|
| 615,006 | France | Oct. 1, 1926 |